United States Patent [19]

Taylor

[11] 3,955,626

[45] May 11, 1976

[54] MULTI-ROW VINEYARD CULTIVATOR

[76] Inventor: Clyde L. Taylor, 1545 S. Chinowith Road, Visalia, Calif. 93277

[22] Filed: Nov. 29, 1974

[21] Appl. No.: 528,078

[52] U.S. Cl. .................................... 172/6; 172/643; 172/650; 172/675; 172/696; 172/699; 172/642; 172/629

[51] Int. Cl.² .................... A01B 63/02; A01B 39/16

[58] Field of Search ..................... 172/6, 5; 47/1.43; 56/27.5, 331

[56] References Cited

UNITED STATES PATENTS

| | | | |
|---|---|---|---|
| 2,206,283 | 7/1940 | Jacobs et al. | 172/6 X |
| 3,387,665 | 6/1968 | Fischer et al. | 172/6 |
| 3,654,753 | 4/1972 | Gervais | 56/27.5 |
| 3,658,136 | 4/1972 | Ernst | 47/1.43 X |

*Primary Examiner*—George J. Marlo
*Attorney, Agent, or Firm*—Flehr, Hohbach, Test, Albritton & Herbert

[57] ABSTRACT

A multi-row vineyard cultivator for cultivating a plurality of generally parallel rows of grape vines simultaneously having a wheeled framework adapted to travel over the rows with first and second outriggers mounted on the framework extending from the framework in a direction generally perpendicular to the line of travel so that they overlie a row on each side of the framework. A downwardly depending post is provided on each of the outriggers. Cultivator assemblies are mounted on each of the posts which are adequate for one row. A hydraulic actuator is provided for moving the post and the cultivator assemblies carried thereby longitudinally along the outrigger associated therewith. A sensing assembly is also provided for sensing the location of the vines in the row as the framework is advanced down the row and is connected to the hydraulic actuator for moving the post so that the cultivator assemblies are properly positioned with respect to the grape vines so that the cultivator assemblies can be advanced without damaging the grape vines.

15 Claims, 7 Drawing Figures

FIG_1
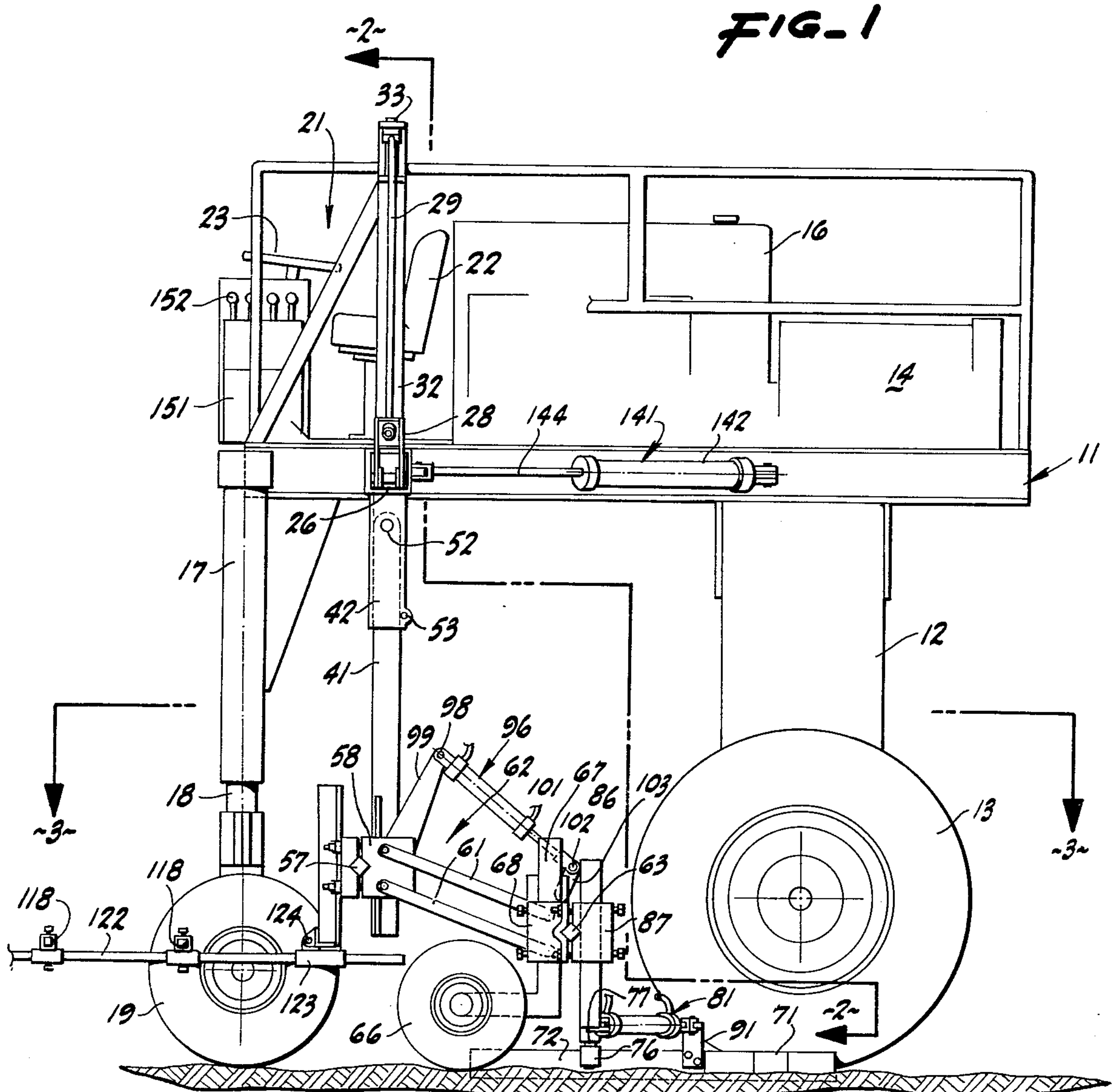
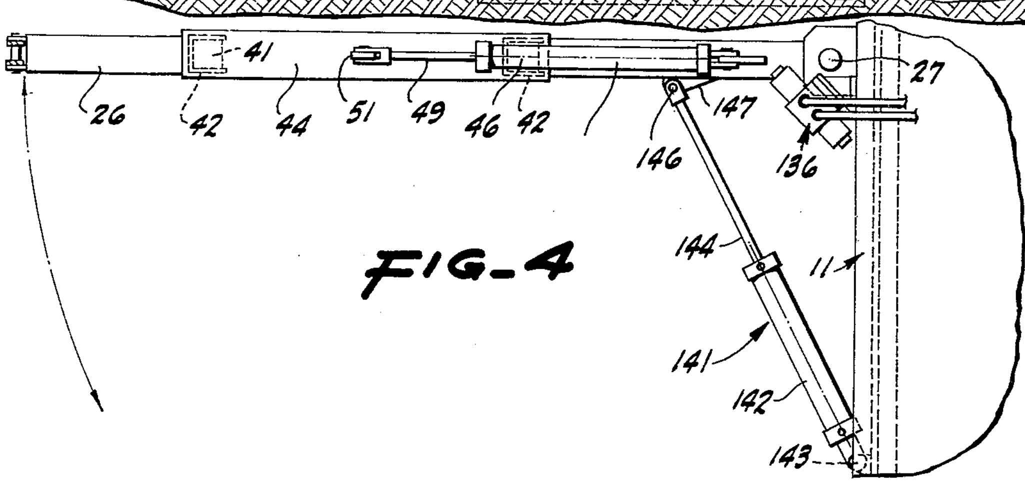
FIG_4

MULTI-ROW VINEYARD CULTIVATOR

BACKGROUND OF THE INVENTION

In the past it generally has been the practice to cultivate one side of a row of grape vines at a time. This has been true because the grape vines are very high. As the grape vineyards become larger in size, this has been very difficult and time consuming. There is therefore a need for a new and improved cultivator for grape vines.

SUMMARY OF THE INVENTION AND OBJECTS

The multi-row vineyard cultivator is utilized for cultivating a plurality of generally parallel rows of grape vines simultaneously. The cultivator comprises a wheeled framework which is adapted to travel on the rows. First and second outriggers are mounted on the framework and extend from the framework and are adapted to overlie a row on each side of the framework. Downwardly depending post means is provided on each of the outriggers. Cultivator assemblies are mounted on the post means. Means is provided for moving the post means and the cultivator assemblies carried thereby longitudinally of the outrigger. Means is also provided for sensing the location of the grape vines in the row as the framework is advanced and is connected to the means for moving the post means so that the cultivators are properly positioned with respect to the vines as the cultivator assemblies are advanced.

In general, it is an object of the present invention to provide a multi-row vineyard cultivator which makes it possible to cultivate more than one row of vines in a vineyard at a time.

Another object of the invention is provide a cultivator of the above character in which the cultivator means for all of the rows except the row immediately underlying the framework are sensed electronically to position the cultivator means.

Another object of the invention is to provide a cultivator of the above character which can be readily moved about in the field.

Another object of the invention is to provide a cultivator of the above character which can be utilized with very tall grape vines.

Another object of the invention is to provide a cultivator of the above character in which the position of the rows being cultivated are sensed to position the cultivator assemblies.

Another object of the invention is to provide a cultivator of the above character which can be automatically steered.

Additional objects and features of the invention will appear from the following description in which the preferred embodiment is set forth in detail in conjunction with the accompanying drawing.

BRIEF DESCRIPTION OF THE DRAWINGS

FIG. 1 is a side elevational view of a cultivator incorporating the present invention.

FIG. 4 is a cross-sectional view taken along the line 4—4 of FIG. 2.

BRIEF DESCRIPTION OF THE PREFERRED EMBODIMENTS

Figure 2:
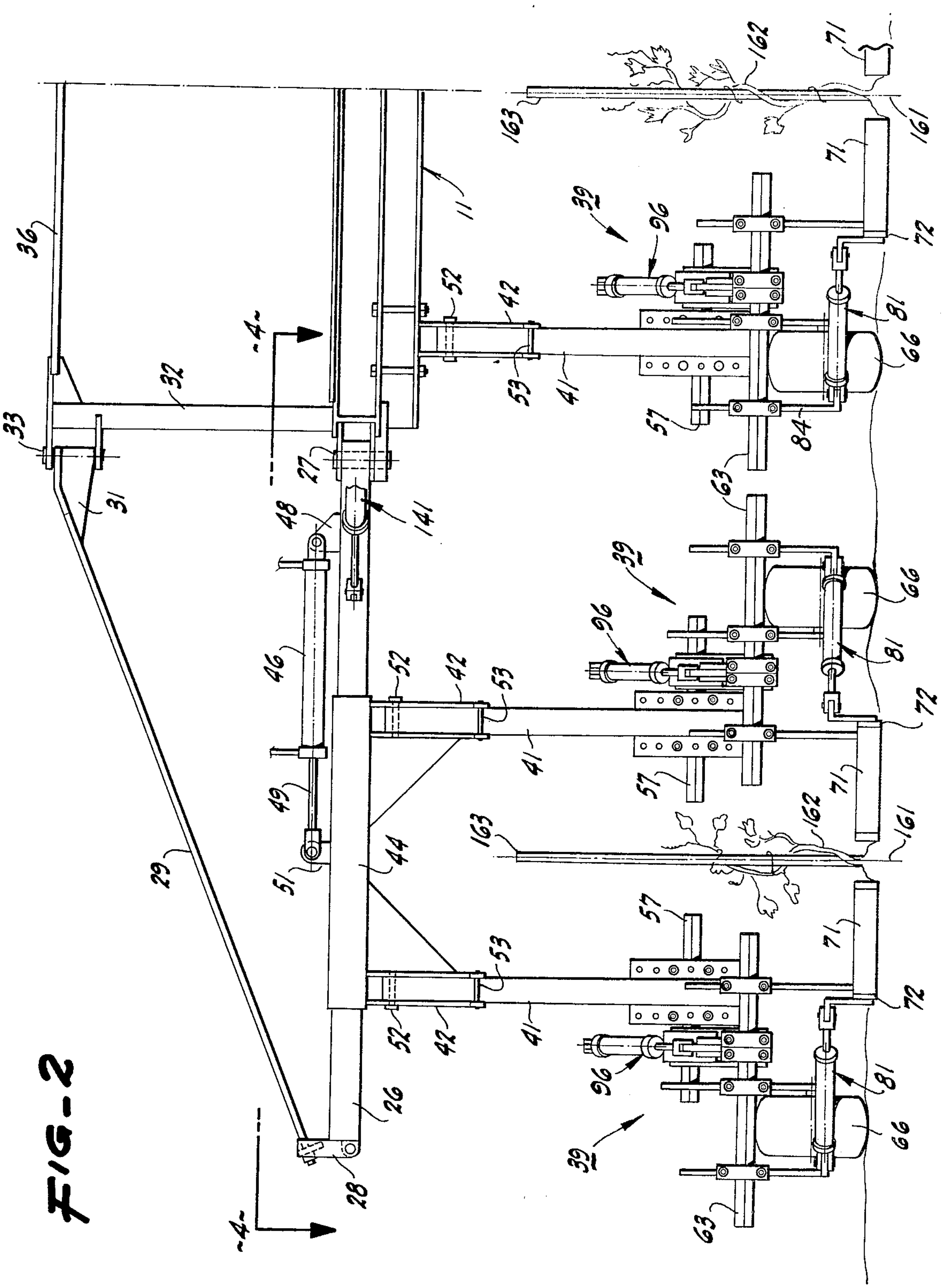
FIG. 2 is a cross-sectional view taken along the line 2—2 of FIG. 1.

The multi-row vineyard cultivator which is shown in FIGS. 1–6 of the drawings consists of a wheeled framework 11 which is in the form of a self-propelled tractor. The wheeled framework 11 has mounted thereon a pair of substantially parallel downwardly extending support structures 12 which have spaced apart rear driven ground engaging wheels 13 rotatably mounted thereon. The reer wheels 13 are adapted to be driven by a chain drive (not shown) which in turn is driven from a speed gear reducing unit 14 mounted upon the framework 12. The gear reducing unit is driven by an internal combusion engine 16 of a conventional type mounted upon the framework 11. The front end of the framework 11 is provided with a pair of spaced downwardly extending sleeves 17 which have posts 18 mounted therein for vertical and rotational movement. A pair of spaced apart ground-engaging front wheels 19 are rotatably mounted upon the posts 18. The front wheels 19 are spaced apart so that they are in alignment with the rear wheels 13.

An operator's driving station 21 is mounted upon the framework 11 immediately forward of the engine 16 and is provided with an operator's seat 22 mounted upon the framework. A steering wheel 23 is mounted upon the framework 11 forward of the driver and is utilized by the operator or driver for causing steering movement of the posts 18 to guide the wheels 19 down the field or vineyard as hereinafter described.

It can be seen that construction of the selfpropelled wheeled vehicle is such that the framework 11 is spaced far above the ground to permit clearance of the grapevines as hereinafter described as the tractor moves down the field or vineyard.

A pair of generally horizontally extending outriggers or arms are mounted on opposite sides of the framework 11. As shown in FIG. 2, the inner extremities of the outriggers 26 are pivotally connected to the framework 11 by pins 27 which will permit the outriggers 26 to swing to the rear so that the cultivator will require less space during movement of the same when not in use. The outer ends of the outriggers 26 are supported by brackets 28. The brackets 28 are secured to upwardly extending rods 29 which are secured to brackets 31. The brackets 31 are pivotally connected to vertically extending posts 32 mounted upon the framework 11 by pins 33. A reinforcing rod 36 extends between the posts 32.

A plurality of cultivator assemblies 39 are mounted upon the framework 11 and upon the outriggers 26. As shown particularly in FIG. 3, six of such cultivator assemblies 39 have been provided so that the cultivator is capable of cultivating three rows of grape vines simultaneously. The cultivator assemblies 39 are provided with vertically extending posts 41. The two cultivator assemblies 39 underlying the framework 11 are mounted in a pair of U-shaped members 42 which are secured to the framework 11 and extend downwardly from the framework 11. The outer two cultivator assemblies 39 on each side of the wheeled framework are also mounted in the U-shaped members 42 in spaced apart positions. The vertically extending sleeves 42 are secured to horizontally extending sleeves 44 which are slidably mounted upon the outriggers or arms 26.

Means is provided for shifting the sleeve 44 longitudinally of the outriggers 26 and consists of hydraulic actuators 46. The cylinder 47 of the hydraulic actuators 46 is pivotally connected to a bracket 48 secured to the outrigger 26. The piston rod 49 of the hydraulic actuator 46 is pivotally connected to a bracket 51 secured to the sleeve 44. It can be readily seen that as the hydraulic actuators 46 are operated, the sleeves 44 will be moved longitudinally in one direction or the other on the outriggers 26.

Each of the posts 41 is secured to the U-shaped member 42 by a pivot pin 52 near the upper end of the U-shaped member 42. A breakaway pin 53 is mounted on the lower extremity of the sleeve 42 for holding the posts 41 in a generally vertical direction.

Each of the cultivator assemblies 39 consists of a tool bar clamp 56 which is secured to the lower extremity of each of the posts 41. A horizonally extending tool bar 57 is mounted in the tool bar clamp 56. A large tool bar clamp 50 is secured to the tool bar 57 adjacent one side of the tool bar clamp 56. Another large tool bar clamp 59 is provided which is disposed to the rear of the tool bar clamp 58 and is connected thereto by spaced pairs of arms or links 61 which in cooperation with the tool bar clamps 58 and 59 form a parallelogram assembly 62 so that a tool bar 63 carried by the tool bar clamp 59 is raised and lowered in a generally vertical direction without rotation of the tool bar 63.

Means is provided for supporting the tool bar 63 so that is is spaced generally a predetermined distance above the ground over which it travels. It consists of a rubber tired wheel 66 which is rotatably mounted upon an L-shaped arm 67 adjustably mounted in a tool clamp 68 on the tool bar 63.

A pair of spaced spring-like cultivator members 71 are provided with each cultivator assembly 39. As shown particularly in FIG. 5, they are generally parallel to each other and extend inwardly and to the rear towards the row of grapes. The cultivator members 71 are secured at opposite ends of a bar 72 lying in a horizontal plane and extending in a direction generally parallel to the path of travel of the cultivator by bolts 73. The bar 72 has a sleeve 76 mounted thereon substantially equidistant from the ends thereof. The sleeve 76 is rotatably mounted upon a stub shaft 77. The stub shaft 77 is carried by a vertically extending bar or post 78 which is mounted in a tool clamp 79 secured to the tool bar 62.

Means is provided for adjusting the angular position of the bar 72 and consists of a hydraulic actuator 81 having a cylinder 82 which is pivotally connected by a pin 83 to a bracket 84 carried by a vertically extending bar or post 86 which is adjustably mounted upon the tool bar 62 by a tool clamp 87. The piston rod 88 of the hydraulic actuator 81 is pivotally connected by a pin 89 to a bracket 91. The bracket 91 is secured to one end of the bar 72 by one of the bolts 73.

Means is provided for raising and lowering the spring-like cultivator members out of engagement with the ground as well as the ground-engaging wheel 66 and consists of a hydraulic actuator 96 which has a cylinder 97 pivotally connected by a pin 98 to a bar 99 which extends downwardly and is secured to the tool bar clamp 56 as shown in FIG. 1. The piston rod 101 of the hydraulic actuator 96 is pivotally connected by pin 102 to a bar 103 which is secured to the tool bar clamp 58.

Automatic row finder means is provided for sensing the positions of the grape vines to guide the cultivator assemblies as hereinafter described. The guiding means consists of a pair of spaced generally parallel sensing assemblies 111 extending in a direction generally transverse of the path of movement of the cultivator. Each of the sensing assemblies 111 consists of a plastic rod 112 which is mounted within a copper tube 113. The copper tube 113 is carried by a plastic rod 114. The plastic rod 114 is mounted on one end of a coil spring 116 which is mounted upon a limit switch 117. The limit switch 117 is mounted upon one end of a tube 118 and has electrical wiring 119 connected to the limit switch and extending through the tube. The limit switches 117 can be of a suitable type such as those manufactured by Allen Bradley under Catalog Number 802T-H. The tube 118 is secured by a clamp assembly 121 to a forwardly extending bar 122. The rear extremity of the bar 122 is mounted in a clamp 123 which is pivotally mounted by a pin 124 for pivotal movement about an axis which is generally parallel to the axis of the tool bar 57. The pin 124 is secured to a bracket 126 mounted upon an angle member 127. The angle member 127 is secured in the desired vertical position on the tool bar clamp 58 by bolts 129. The forward extremities of the bars 122 are provided with upwardly turned shoes 131 so that the bars 122 will not accidentally dig into the ground.

The electrical limit switches 117 are electrically connected to solenoid-operated valve assemblies 136 mounted upon the framework 11 (see FIG. 4) which control the flow of fluid to hydraulic actuators as hereinafter described.

Means is provided for moving the outer extremities of each of the outriggers 46 rearwardly so that the cultivator will take less space in moving through a certain area and consists of a hydraulic actuator 141 which has its cylinder 142 pivotally connected by a pin 143 to the framework 11. The piston 144 is pivotally connected by a pin 146 to a bracket 147 mounted on the outrigger arm 26.

Figure 7:
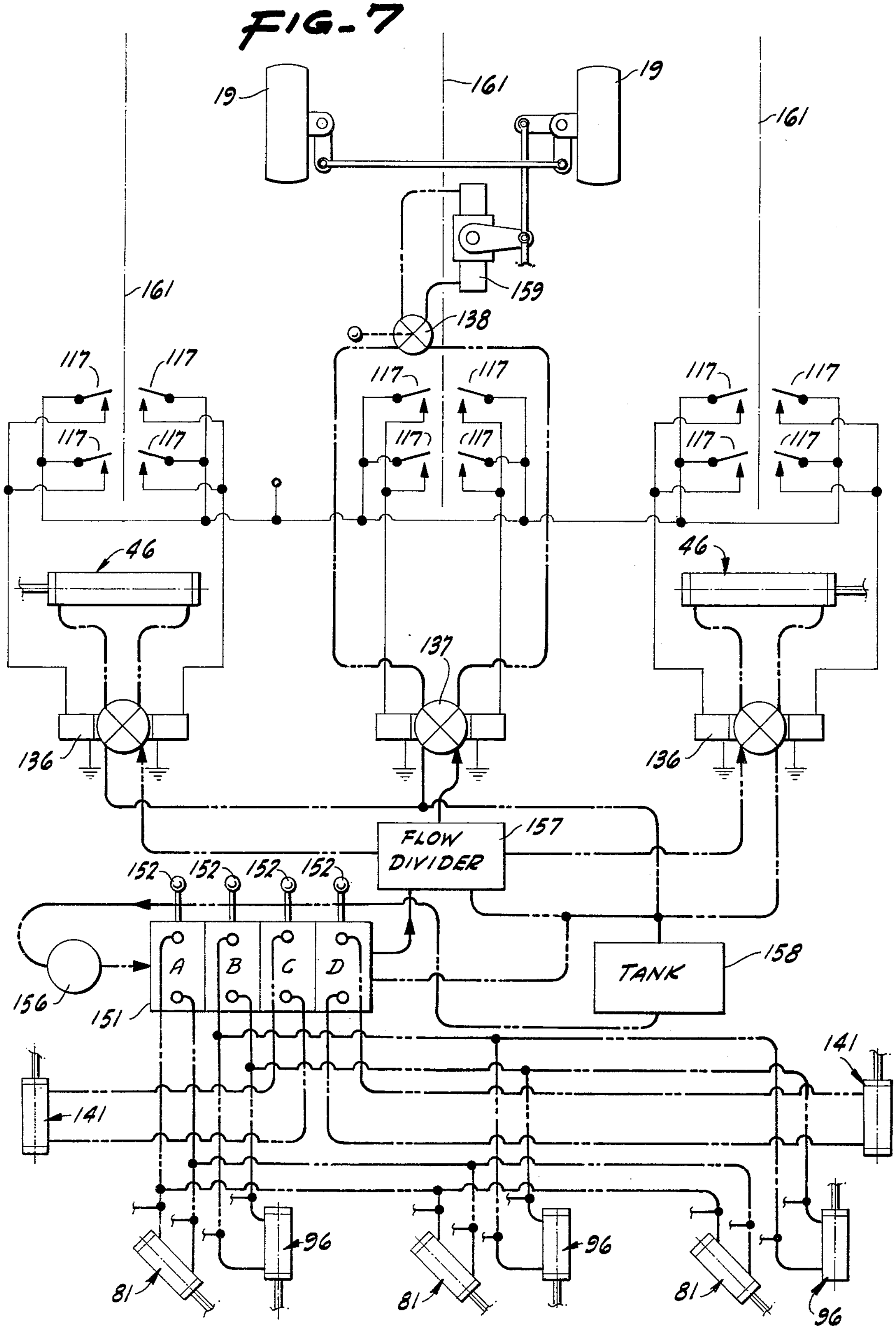
FIG. 7 is a schematic diagram of the hydraulic system utilized in the present invention.

The hydraulic system utilized on the cultivator is shown in FIG. 7 and consists of a four-stage stack valve assembly or console 151 of a conventional type having four control handles 152 as shown in FIG. 7. The stages are identified as A through D. Hydraulic fluid is supplied to the assembly 151 from a hydraulic pump 156 which is driven by the engine 16. Hydraulic fluid passing from the stack valve assembly 151 is supplied by a flow divider 157 which is connected to an overflow reservoir or tank 158. The tank 158 is also connected to the pump 156 as shown.

Stage A of the control console 151 is connected to the actuator assemblies 81 which are utilized for opening and closing the cultivator assemblies hereinafter described. Stage B is utilized for operating the hydraulic actuators 96 for raising and lowering the cultivator assemblies; stage C is utilized for controlling the hydraulic actuator 141 for the left outrigger, and stage D is utilized for controlling the hydraulic actuator 141 for the right outrigger.

Hydraulic fluid from the flow divider 157 is supplied to the solenoid operated valve assemblies 136. Each of the solenoid operated valve assemblies 136 is provided with a control valve 137 which controls the supply of fluid from the solenoid operated valve assembly 136 to left and right actuators 46. Similarly, the central solenoid operated valve assembly 136 is also provided with a valve 137 which supplies fluid to a manually controlled valve 138 which can alternatively be positioned to permit automatic control or manual control of the hydraulic fluid supplied to a steering mechanism 161 which is schematically illustrated for steering the wheels 19 in accordance with the hydraulic fluid supplied to the hydraulic actuator 159.

Operation and use of the multi-row vineyard cultivator may now be briefly described as follows. From the construction shown and described, it can be seen that six cultivator assemblies 39 have been provided (see FIG. 3) in which two of the cultivator assemblies immediately underlie the framework 11 and are disposed between the front and rear driving wheels 13 and 19 and two cultivator assemblies 39 are disposed on each side of the framework 11. As will be noted, the cultivator assemblies 39 immediately underlying the framework 11 are also provided with automatic row sensing means whereby the operator of the tractor in the driving station is freed from the steering of the vehicle and would not steer the same unless he manually overrode the automatic steering through operation of the control valve 138.

Figure 3:
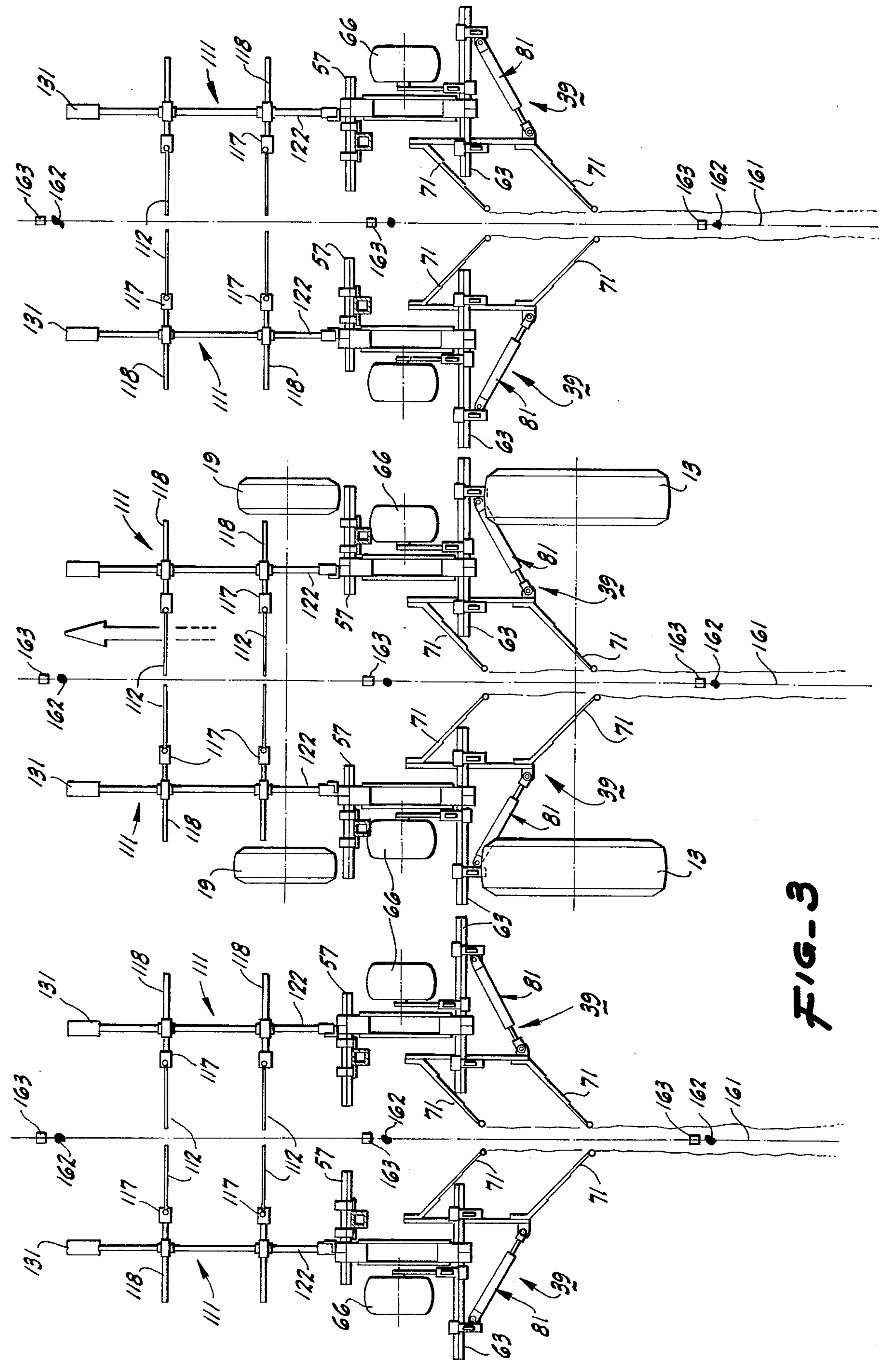
FIG. 3 is a cross-sectional view taken along the line 3—3 of FIG. 1.
Figures 5, 6:
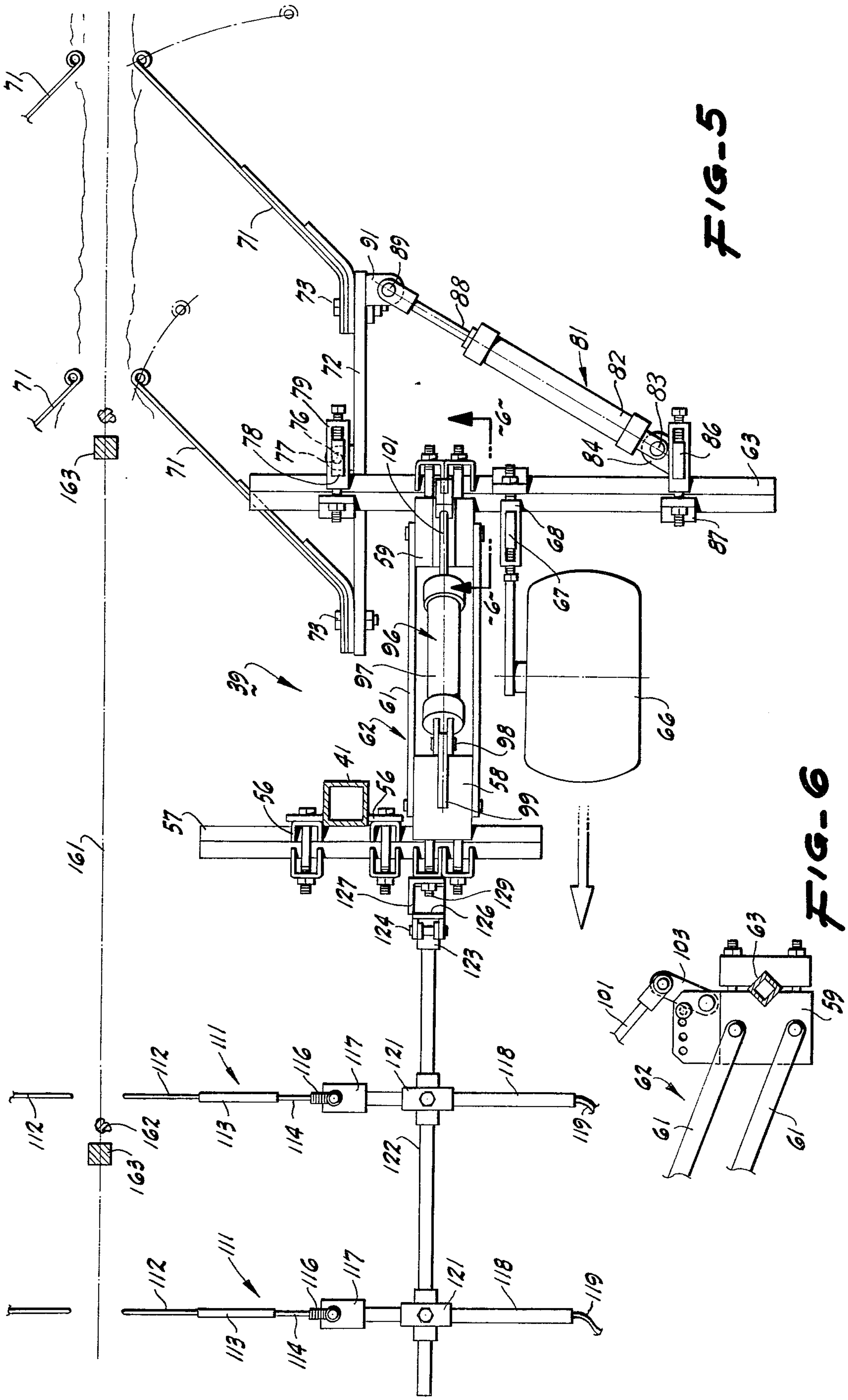
FIG. 5 is an enlarged view of one of the cultivator assemblies.
FIG. 6 is a cross-sectional view taken along the line 6—6 of FIG. 5.

In order to describe the operation of the cultivator, let it be assumed that the cultivator is being moved into a field and that the outrigger arms 26 have been moved to their rearmost positions generally adjacent the framework 11 with the cultivator assemblies 39 in raised positions. The operator advances the cultivator into the field or vineyard in which the cultivation is to be carried out. The driver of the cultivator positions the cultivator so that the wheels 13 and 19 will be straddling one of the rows of vines so that the cultivator assemblies on opposite sides will cultivate a row on each side of the straddled row. As is shown in FIG. 3, the vineyard is typically provided with a plurality of spaced rows 161 in which the rows are a suitable distance apart such as 12 feet apart and in which the plants are spaced 8 feet apart in each row. In such vineyards the plants 162 have positioned near thereto stakes 163 upon which the grapevines can travel during their growth. With a cultivator of the present type, the stakes 163 can be relatively tall as for example 6 to 8 feet without interfering with the cultivating operation as hereinafter described.

As soon as the cultivator has been properly positioned manually by the operator, the outrigger arms 26 are moved forward until they extend generally laterally of the framework 11 as shown in FIG. 3 of the drawings by operation of the control handles 152 to control the hydraulic actuators 141 to retain the outriggers 26 in the desired positions.

As soon as this has been accomplished, the cultivator assemblies 39 can be lowered by operating the hydraulic actuators 96 to lower the wheels 66 to the ground. One of the control handles 152 is operated to control the hydraulic actuators 81 to thereby control the spacing between the cultivator tool members 71.

One of the control members 152 is also operated to generally position the hydraulic actuator 46 so that the two outermost cultivator assemblies are generally aligned with a row of grape vines 161 on opposite sides of the framework 11. The automatic sensing means is then placed in operation to control the operation of the hydraulic actuators 46.

As soon as all of this has been accomplished, the operator advances the cultivator down the three rows which are to be cultivated with the cultivator. The operator by looking downwardly immediately beneath the framework 11 can readily view the row of grapevines immediately underlying the framework 11 and over which the framework 11 will travel and thus steer the front wheels 19 so that the central pair of cultivator assemblies will be properly guided to cultivate the straddled row of grape vines. During the time this is occurring, the positions of the row on each side relative to the central or straddled row will be gauged by the sensing assemblies 111. When one of the sensing assemblies engages a plant 162 or one of the posts 163, the associated solenoid-operated valve will be operated to cause operation of the hydraulic actuator 46 to cause movement of the cultivator assembly in such a manner so that the cultivator tools will not strike the plant or damage the same.

As soon as the cultivator is advancing down the rows, automatic steering of the cultivator can be accomplished merely by placing the valve 138 in the proper position to permit the fluid being supplied to the hydraulic actuator 159 to be controlled from the solenoid operated valve 137 under the control of the microswitches 117 to control the steering. As the switches 117 are operated, it can be seen that the vehicle will be steered down the row of vines over which the central cultivator assemblies are traveling.

From the foregoing, it can be seen that the tractor would be properly steered down the vineyard without damaging the grape vines and at the same time cultivating three rows at a time. It can also be seen that it is readily possible by an operator of the vehicle to readily cultivate three rows of grapes while only observing one row, the straddled row. The outside two rows are electrically sensed and will be cultivated at the same time the central row is being cultivated and the cultivator is being automatically steered.

It is apparent from the foregoing, that there has been provided a multi-row vineyard cultivator which is particularly suitable for the cultivation of grape vines. The tractor straddles the center row of the three rows which are to be cultivated so that it makes it possible for the operator to easily steer the tractor down one row. The cultivator assemblies for the outside two rows are positioned by electromechanical sensing means which causes the cultivators to move so that they will not get into the vines and tear them up. In addition, if desired, the driving can be also controlled by electromechanical means as hereinbefore described.

The cultivator also is the type which can be readily moved from one location to another and can be readily turned about in the field.

I claim:

1. In a multi-row vineyard cultivator for cultivating a plurality of generally parallel rows of grapevines simultaneously, a wheeled framework adapted to travel along the rows, first and second outriggers mounted on the framework and extending from the framework and adapted to overlie a row on each side of the framework, post means carried by each of the outriggers and depending downwardly, cultivator assemblies mounted on said post means in spaced apart positions, means for moving said post means and the cultivator assemblies carried thereby longitudinally of the outrigger and means for sensing the location of the vines in the row as the framework is advanced and connected to said means for moving said post means so that the cultivator assemblies are properly positioned with respect to the vines as the cultivator is advanced down the rows.

2. Apparatus as in claim 1 wherein said cultivator assemblies mounted upon said post means have at least one ground engaging wheel whereby said cultivator assemblies are maintained in a generally constant elevation with respect to the ground as the cultivator assemblies are advanced.

3. A cultivator as in claim 1 wherein each of said cultivator assemblies includes a tool bar, means connecting the tool bar to the post means whereby the tool bar can be raised and lowered, a ground engaging wheel connected to said tool bar and serving to maintain a predetermined spacing between the tool bar and the ground, ground engaging members carried by the tool bar and means connected to the tool bar for changing the angular positions of said ground engaging members.

4. A cultivator as in claim 3 wherein said ground engaging members are in the form of spring-like members lying in a generally horizontal plane.

5. A cultivator as in claim 1 together with means connected between said post means and said cultivator assemblies for raising said cultivator assemblies out of engagement with the ground when they are not in use.

6. A cultivator as in claim 1 together with a tool bar carried by said post means and extending in a generally horizontal direction, an additional tool bar and means connecting said first named and additional tool bars so that as the additional tool bar is raised and lowered, it moves in a generally vertical direction, a ground engaging wheel connected to said additional tool bar and serving to maintain a predetermined relationship between the additional tool bar and ground and ground engaging members carried by the additional tool bar for cultivating the ground.

7. A cultivator as in claim 6 wherein each of said cultivator assemblies includes a bar pivotally mounted on said additional tool bar and means connected to said tool bar for causing movement of said bar carrying said ground-engaging members at an angle with respect to the ground-engaging wheel.

8. A cultivator as in claim 1 wherein said means for sensing the locations of the vines includes a support member extending forwardly from the first named tool bar and sensing members carried by the forwardly extending bar and adapted to be engaged by the vine or other structure to guide the movement of the cultivator assembly.

9. A cultivator as in claim 1 wherein said wheeled framework straddles one of the rows.

10. A cultivator as in claim 9 wherein said wheeled framework is self-propelled.

11. A cultivator as in claim 1 together with means for pivotally mounting the outriggers on the wheeled framework and means for moving the outriggers in a direction so that the outer ends can be swung to the rear generally alongside the framework.

12. A cultivator as in claim 11 wherein said means for moving said outriggers to the rear includes means for maintaining said outriggers in generally outwardly extending positions so that the cultivator assemblies are adapted to engage rows of vines on opposite sides of the framework.

13. In a multi-row vineyard cultivator for cultivating a plurality of generally parallel rows of grapevines simultaneously, a wheeled framework adapted to travel over one of the rows, a cultivator assembly mounted on said framework for cultivating the row over which the wheeled framework travels, first and second outriggers mounted on the framework and extending from the framework and adapted to overlie a row on each side of the framework, post means carried by each of the outriggers and depending downwardly therefrom, cultivator assemblies mounted on said post means in spaced apart positions, means for moving said post means and the cultivator assemblies carried thereby longitudinally of the outrigger, means carried by each of the cultivator assemblies for sensing the location of the vines in the row as the framework is advanced, means connected to the cultivator assemblies for cultivating the row over which the wheeled framework travels for causing steering movement of said wheeled framework, and means connected to said means for moving said post means and the cultivator assemblies carried thereby and to the sensing means connected to the cultivator assemblies mounted on the post means for positioning the cultivator assemblies mounted on the post means with respect to the vines as the cultivator is advanced over the rows.

14. A cultivator as in claim 13 together with means for overriding said means for causing steering movement of said wheeled framework so that the sterring of the wheeled framework can be manually controlled.

15. A cultivator as in claim 13 wherein each of said cultivator assemblies includes at least one ground ehgaging wheel so that the cultivator assemblies are maintained in a generally constant elevation with respect to the ground as the cultivator assemblies are advanced.

* * * * *